United States Patent [19]
Kelley et al.

[11] Patent Number: 5,701,405
[45] Date of Patent: Dec. 23, 1997

[54] METHOD AND APPARATUS FOR DIRECTLY EVALUATING A PARAMETER INTERPOLATION FUNCTION USED IN RENDERING IMAGES IN A GRAPHICS SYSTEM THAT USES SCREEN PARTITIONING

[75] Inventors: Michael W. Kelley, San Mateo; Stephanie L. Winner, Santa Clara, both of Calif.

[73] Assignee: Apple Computer, Inc., Cupertino, Calif.

[21] Appl. No.: 492,923

[22] Filed: Jun. 21, 1995

[51] Int. Cl.$^6$ ............................................... G06F 15/00
[52] U.S. Cl. ................................................... 395/141
[58] Field of Search ................................ 395/141, 142, 395/143; 345/118, 136, 138

[56] References Cited

U.S. PATENT DOCUMENTS 5,457,775 10/1995 Johnson, Jr. et al. ............... 395/141

OTHER PUBLICATIONS

James D. Foley, et al, Computer Graphics Principles and Practice, 2nd ed. "Filling Polygons" 1990, pp. 92–95.

Fuchs, Henry, et al., "Pixel–Planes 5: A Heterogeneous Multiprocessor Graphics System Using Processor–Enhanced Memories", ACM Computer Graphics, vol. 23, No. 3, Jul. 1989, pp. 79–88.

Akeley, Kurt, et al., "High Performance Polygon Rendering", ACM Computer Graphics, vol. 22, No. 4, Aug. 1988, pp. 239–246.

Potmesil, Michael, et al, "The Pixel Machine: A Parallel Image Computer", ACM Computer Graphics, vol. 23, No. 3, pp. 69–78.

*Primary Examiner*—Phu K. Nguyen
*Attorney, Agent, or Firm*—Blakely, Sokoloff, Taylor & Zafman

[57] ABSTRACT

A method and apparatus for directly evaluating a parameter interpolation function in a computer graphic system that renders a geometric entity (such as a polygon) by partitioning a display device into a number of local regions. The computer graphic system initially determines that a first set of pixels in a first local region of the display device is covered by a geometric entity. A geometric entity's boundary defining data (e.g., the geometric entity's vertex coordinates defined relative to a display device coordinate system) is employed to generate a local set of coordinates that are defined relative to a first local coordinate system of the first local region for all pixels of the first set of pixels. A first local parameter interpolation function, which represents the parameter values for all pixels of the first set of pixels when these pixels are defined relative to the first local coordinate system, is then generated. The local parameter interpolation function and the local set of coordinates are used to directly calculate the parameter values of the pixels of the first set of pixels.

17 Claims, 12 Drawing Sheets

FIG. 2 *(PRIOR ART)*

METHOD AND APPARATUS FOR DIRECTLY EVALUATING A PARAMETER INTERPOLATION FUNCTION USED IN RENDERING IMAGES IN A GRAPHICS SYSTEM THAT USES SCREEN PARTITIONING

BACKGROUND OF THE INVENTION

1. Field of the Invention

The present invention relates to the field of computer graphics display systems, and particularly to a method and apparatus for directly evaluating a parameter interpolation function used in rendering images in a graphics system that uses screen partitioning.

2. Description of the Related Art

Systems that implement interactive three-dimensional rendering commonly generate triangles with vertices in two-dimensional screen coordinates by transforming, shading, clipping, and projecting three-dimensional graphical objects that are defined in a three-dimensional world coordinate system. Typically, these screen space triangles are then rasterized into the screen frame buffer by a method often called "smooth-shading" or Gouraud shading. This method involves interpolating one or more parameter values (such as light intensity values, depth values, texture map reference values, etc.) across the screen space triangles. For example, the interpolated parameters may either be used to compute each pixe's color directly (e.g., if the interpolated parameters are light intensity values for different wavelengths of light, such as red, green, and blue light) or indirectly (e.g., if the interpolated parameters are texture map reference values for referencing a texture map).

More specifically, assume that a parameter p is to be interpolated across a screen space triangle, which is shown in FIG. 1. As shown in this figure, the triangle data specifies (1) the screen coordinate position of all three triangle vertices (A, B, and C), and (2) the value of p at each of those vertices. Note that the x and y values may be pixel coordinates, or more typically they may specify vertex position with more precision than the pixel position (often called sub-pixel positioning). Given these three coordinates and parameter data sets, it is standard practice to compute a function which computes the interpolated values of p in terms of variables x and y. The usual form of this function is set forth below in equation (1).

$$p(x,y) = ax + by + c \qquad (1)$$

In this equation, a, b, and c are constants determined by the vertex data. Once the function $p(x,y)$ has been computed, the graphics rendering system can evaluate the interpolated parameter value $p(x,y)$ for each pixel that falls within the rendered triangle to generate a "smooth-shaded" result.

In the prior art, there are two methods for calculating the parameter value p at each pixel. Under one approach, parameter function $p(x,y)$ is directly evaluated for each pixel of the screen space triangle. To directly evaluate the parameter function $p(x,y)$ for a given pixel D at $x_D$, $y_D$ requires two multipliers and two additions. As a result, direct evaluation is usually not performed in hardware implementations of rasterizers, because the hardware required for these multiplications is prohibitively large and slow. For example, a common hardware gate array implementation of an adder requires approximately 10 gates per bit. Thus, an adder capable of adding two N bit integers would require 10N gates. In other words, the number of gates required by the adder is directly proportional to the number of bits being added. Furthermore, the number of gates required to implement a multiplier capable of multiplying two N bit integers is typically proportional to $N^2$. In fact, a common approximation is that a N×N multiplier requires approximately $10N^2$ gates.

FIG. 2 presents one prior art hardware implementation of a direct interpolator. This direct interpolator directly evaluates parameter function $p(x,y)$ (i.e., determines the value of $p(x,y)$ at each pixel of a screen space triangle) in a system that renders to a 1024×1024 screen. As the screen has 1024 x values and 1024 y values, the x and y values in the function $p(x,y)$ require 10 bits of precision (as $2^{10}$ equals 1024). Consequently, as shown in FIG. 2, the gate count for this direct interpolator is quite large, which renders it prohibitively slow and costly. It should be noted that the majority of the gates in this design are consumed by the two multipliers.

Therefore, because of the large number of gates used by these multipliers, direct evaluation is not typically used for parameter interpolation. Rather, the evaluation of $p(x,y)$ is commonly performed by forward differencing methods, such as the one set forth in "High-Performance Polygon Rendering," *ACM Computer Graphics*, Vol. 22, No. 4, pp. 239–246. An advantage of the forward differencing method is that, for each pixel in a single horizontal span of the rendered triangle, it requires only a single addition operation per interpolated parameter. This advantage has been particularly important in hardware implementations of triangle rasterizers, as addition can be performed quickly and with a minimum amount of hardware.

Unfortunately, it is difficult to use a forward differencing implementation in a system in which the screen pixels have been partitioned between multiple rasterizers. Screen partitioning is a known method for increasing rendering performance by allocating parallel rendering of several regions of the screen or by enabling caching of regions of the screen. FIG. 3 sets forth one such triangle that crosses screen partitions. Assume the task is to rasterize the portion of the triangle which falls within Partition 2. In this case, because the triangle crosses the boundary between Partition 1 and Partition 2, a special means must be added to compute the values of the interpolated parameters along Edge A, as they can no longer be computed by forward differencing from the left edge of the triangle without a (potentially large) performance penalty to advance to the edge of the partition. Because forward differencing is usually used for both the x and y directions, a triangle which also exceeds the y bounds of a partition also needs a second special means to compute the values of the interpolated parameters along the edge of the triangle crossing the y partition boundary (e.g., along Edge B of FIG. 3).

Therefore, in a system which renders polygons into a screen partition, there are advantages to replacing the forward differencing method with a method that directly evaluates the function $p(x,y)$. If direct evaluation of $p(x,y)$ is used, then the partition boundary problem shown in FIG. 3 has no effect on the algorithm because the rasterizer merely computes the interpolated parameter value based on the x,y value of the partition pixel being shaded.

However, as mentioned before, the use of prior art direct interpolators is problematic, because these interpolators are expensive and slow as they use a large number of gates. Consequently, there is a need for a faster and cheaper method and apparatus for directly evaluating a parameter interpolation function used in rendering images in a graphics system that uses screen partitioning. There is also a specific need for a direct evaluation method and apparatus for directly evaluating the parameter interpolation function p(x, y)=ax+by+c with minimum amount of hardware and with maximum amount of speed.

SUMMARY OF THE INVENTION

The present invention provides a method and apparatus for directly evaluating a parameter interpolation function in a computer graphic system that renders a geometric entity (such as a polygon) by partitioning a display device into a number of local regions. The computer graphic system initially determines that a first set of pixels in a first local region of the display device is covered by a geometric entity. One embodiment of the present invention's method then uses the geometric entity's boundary defining data (e.g., the geometric entity's vertex coordinates defined relative to a display device coordinate system) to generate a local set of coordinates, defined relative to a first local coordinate system of the first local region, for all pixels of the first set of pixels. A first local parameter interpolation function, which represents the parameter values for all pixels of the first set of pixels when these pixels are defined relative to the first local coordinate system, is then generated. Finally, the local parameter interpolation function and the local set of coordinates are used to directly calculate the parameter values of the pixels of the first set of pixels.

BRIEF DESCRIPTION OF THE DRAWINGS

The objects, features, and advantages of the present invention will be apparent from the following detailed description, in which.

DETAILED DESCRIPTION OF THE INVENTION

The present invention provides a method and apparatus for directly evaluating a parameter interpolation function used in rendering images in a computer graphics system that uses screen partitioning. One embodiment of the present invention provides a method and apparatus for directly evaluating the parameter interpolation function p(x,y)=ax+by+c with minimum amount of hardware and with maximum amount of speed. In the following description, numerous details are set forth in order to provide a thorough understanding of the present invention. However, it will be understood by one of ordinary skill in the art that these specific details are not required in order to practice the invention. In other instances, well-known electrical structures and circuits are shown in block diagram form in order not to obscure the present invention with unnecessary detail.

Figure 4:
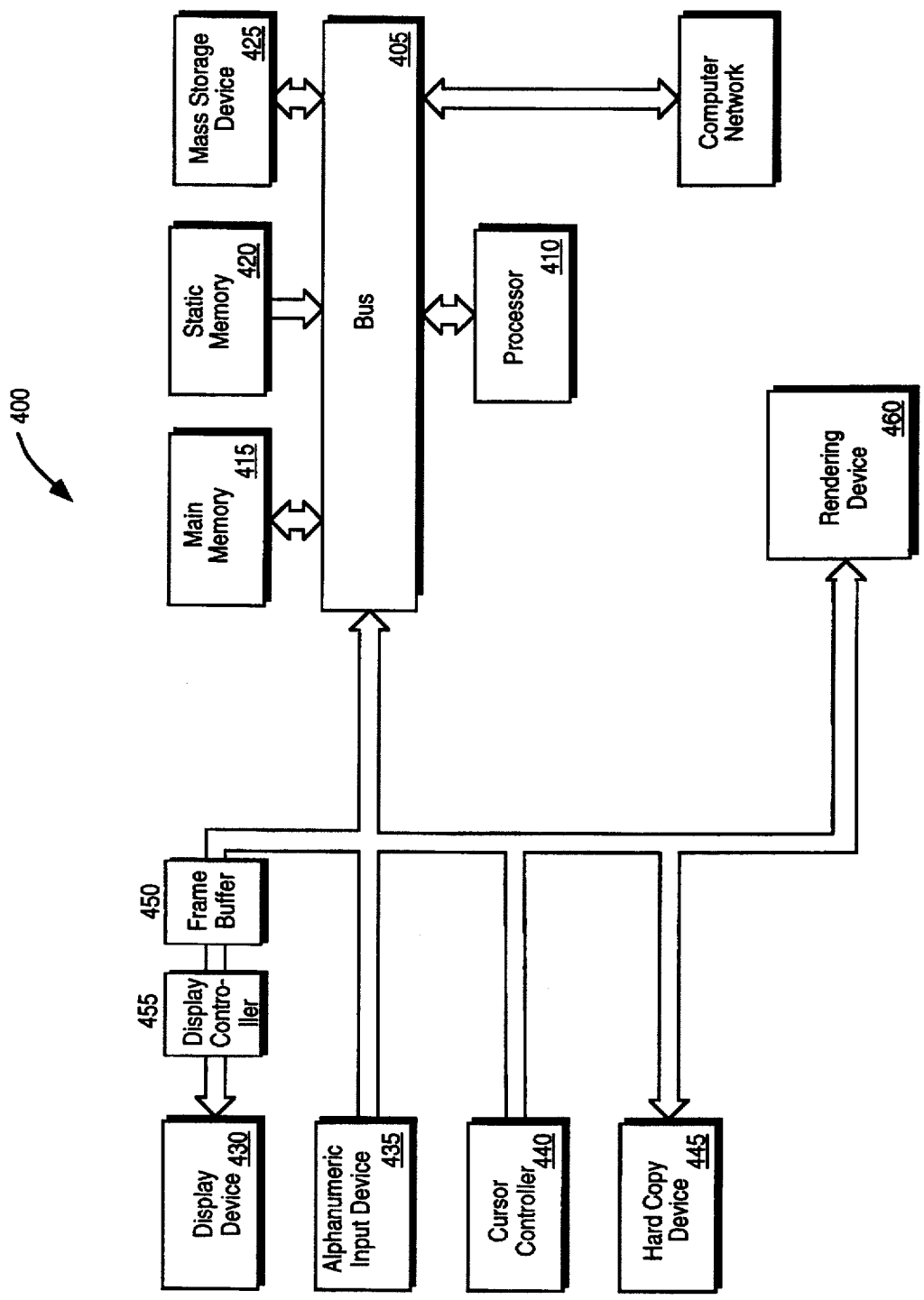
FIG. 4 presents a computer system upon which one embodiment of the present invention is implemented.

For purpose of explanation, FIG. 4 presents a computer system upon which one embodiment of the present invention is implemented. However, one of ordinary skill in the art will appreciate that any other type of configuration for a computer system may be used in conjunction with the present invention. Computer system 400 includes a bus or other communication means 405 for communicating information. A processor 410 couples with bus 405 for processing digital data. Computer system 400 further includes a random access memory (RAM) or some other dynamic storage device 415 (referred to in FIG. 4 as main memory), which also couples to bus 405. Main memory 415 stores digital data and program instructions for execution by processor 410. Main memory 415 also may be used for storing temporary variables or other intermediate information during execution by processor 410. Computer system 400 also includes static storage device 420 (such as a read only memory (ROM)) coupled to bus 405 for storing static information and instructions for processor 410. In addition, mass data storage device 425, such as magnetic disk or an optical disk and its corresponding disk drive, may also be included.

Alphanumeric input device 435 (e.g., a keyboard) may also be coupled to bus 405 for communicating information and command selections to processor 410. An additional user input device which may be included in computer system 400 is cursor controller 440. Input device 440 may take many different forms such as a mouse, a trackball, a stylus tablet, a touchpad, etc. Computer system 400 may also have external hard copy device 445, which may be used for printing a hard copy on paper.

Computer system 400 further includes a display device 430, such as a cathode ray tube (CRT) or a liquid crystal display (LCD), for displaying information to a computer user. Display device 430 couples to bus 405 via frame buffer 450 and display controller 455. Display controller 455 serves as an interface between computer system 400 and display device 430. Furthermore, frame buffer 450 stores the pixel data for driving the display device 430. This stored pixel data is generated by rendering device 460, also known as a graphics accelerator. As further discussed below, at the end of the rendering process, rendering device 460 outputs a high bandwidth pixel stream to frame buffer 450. The information that rendering device supplies to the frame buffer typically consists of pixel data of images or scan lines that are rendered.

For purpose of explanation, a brief general description of one embodiment of rendering device 460 is provided below by reference to FIG. 5. As shown in this figure, one embodiment of rendering 460 utilizes a screen partitioning rendering scheme which allows performance to be improved (1) by enabling simultaneous rendering of several different partitioned regions of the screen, and/or (2) by allowing a smaller (and therefore faster and cheaper) memory than a system frame buffer to be used for storing each region's pixels while rendering occurs. More specifically, under this approach, the rendering process begins when the processor or a dedicated graphics accelerator 500 transforms, projects, and clips three-dimensional graphical primitives (defined in a three-dimensional world coordinate system) from its three-dimensional object database, in order to obtain a collection of two-dimensional geometric entities (defined in a display device coordinate system, such as a two-dimensional screen space coordinate system) that represent the primitives on the display device.

Common two-dimensional geometric entities are character strings, points, straight lines, curved lines, and filled areas (such as polygons, circles, etc.). For instance, graphical primitives are commonly represented by polygon meshes, which are sets of connected, polygonally bounded planar surfaces (such as triangles or quadrilaterals). In addition, for each geometric entity, the computer system stores corresponding attributes that describe how the particular entity is to be displayed. Common attributes that are stored by the computer system include color specifications, line styles, and text styles. Moreover, in one embodiment of the present invention, the processor represents a two-dimensional geometric entity by a data structure which contains the coordinate and attribute information for the vertices of the geometric entity.

In one embodiment of the invention, the two-dimensional geometric entity is a triangle which is represented by three coordinate points, where each of the coordinate points have one or more parameter values which must be interpolated across the triangle. The segments which interconnects the three coordinate points define the bounds of a triangle. In another embodiment of the present invention, the two-dimensional polygon is a quadrilateral, which is defined similarly to a triangle except that it will be defined by four coordinate points (and four corresponding sets of parameter values). In one embodiment of the present invention, a quadrilateral may be provided to the rendering device but it would be converted into a pair of triangles for rendering (each utilizing three of the four coordinate points).

Figure 5:
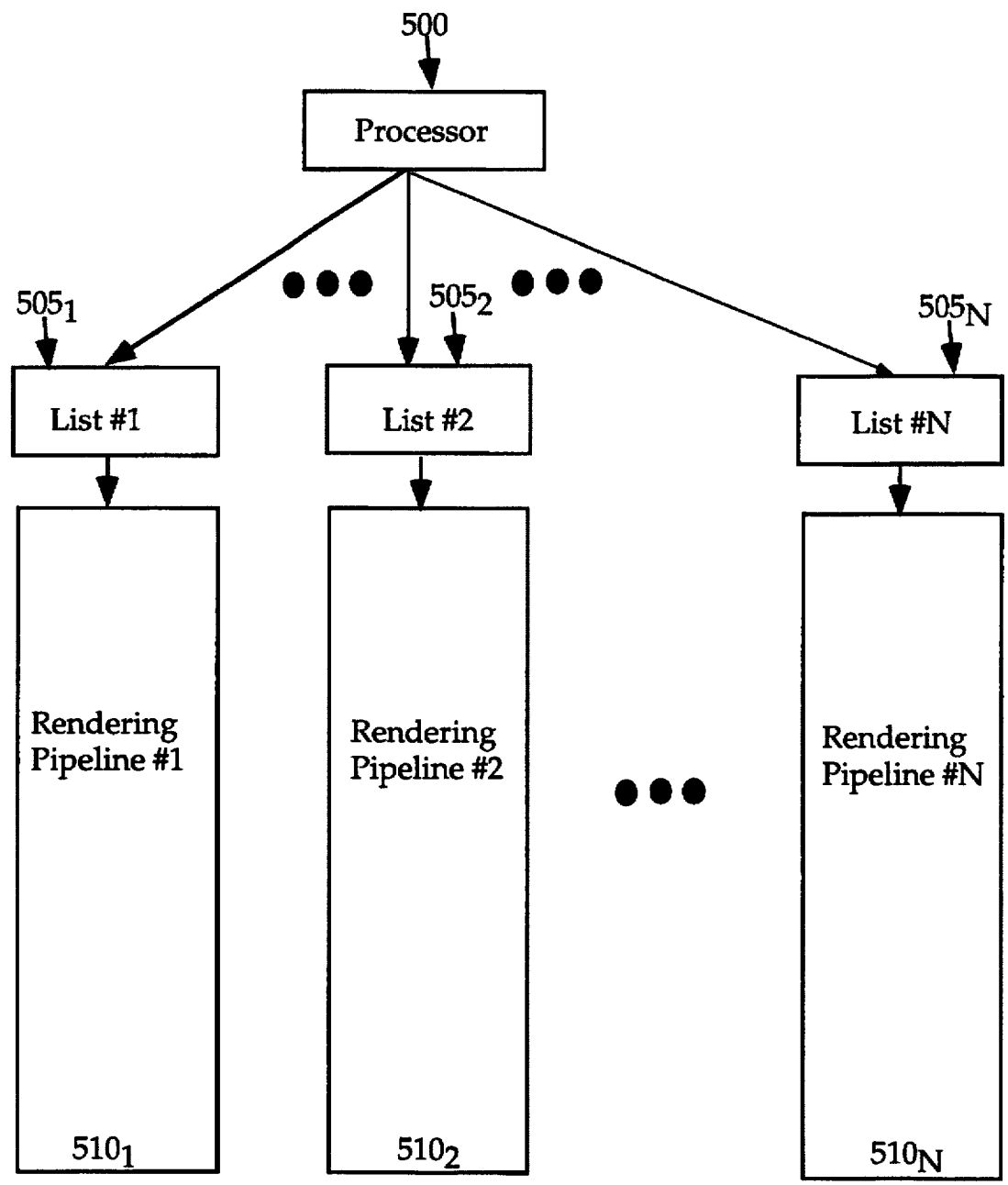
FIG. 5 presents one embodiment of the rendering architecture of the present invention.
Figure 6:
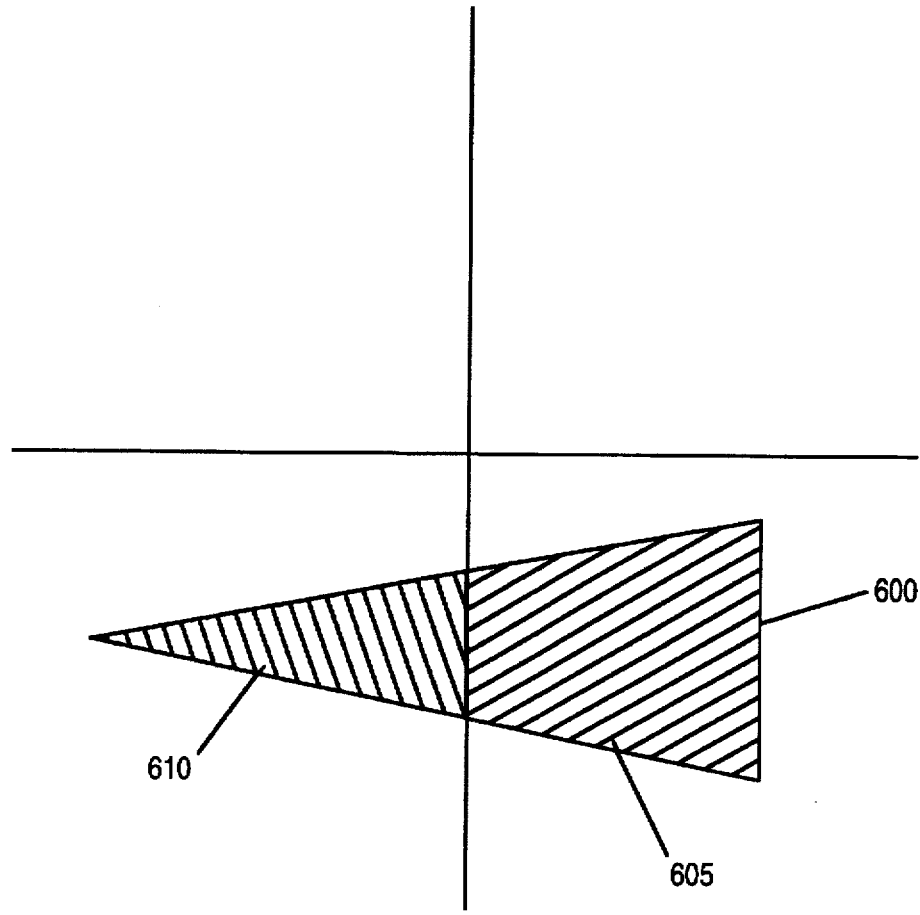
FIG. 6 presents a geometric entity that is displayed on a display device that is partitioned into four regions.

As further shown in FIG. 5, after processor 500 transforms, projects, calculates vertex parameter values, and clips three-dimensional graphical primitives to obtain two-dimensional geometric entities, the processor uses known partitioning schemes (such as those disclosed in "The Pixel Machine: A Parallel Image Computer," ACM Computer Graphics, Vol. 23, No 3, p 69–78) to determine which partitioned region of the display device the geometric entities intersect. For example, as shown in FIG. 6, if the computer graphics systems partitions a display screen into four regions and processor 500 transforms, projects, and clips a three-dimensional graphical primitive to obtain geometric entity 600, the partitioning mechanism of the processor determines that geometric entity 600 covers a first set of pixels 605 in the third region and a second set of pixels 610 in the fourth region. After the processor determines which partitioned regions of the display device the geometric entities intersect, the processor inserts into each region's geometric entity list data pertaining to the geometric entity that intersects the particular region. Triangles which cross more than one partition are added to all affected partition's geometry lists. These geometric entity lists are then stored in one or more rendering pipeline list databases. The geometric entities stored in each rendering pipeline list database are then rendered by one rendering pipeline. Once all the geometric entities for all of the three-dimensional graphical primitives have been processed and placed in their respective partition lists, the rendering pipelines begin processing those lists to render the partitions. For example, as shown in FIG. 5, more than one rendering pipeline 510 is used in the rendering process when more than one rendering pipeline list database 505 are used to store the region geometric entity lists. Although it is possible for only a single rendering pipeline to be used to render the partitions one-by-one, two or more pipelines can be used to increase performance.

In this manner, the embodiment of rendering device 460 that is set forth in FIG. 5 partitions the two-dimensional screen space into a number of regions and then renders the regions by using more than one rendering pipeline. For purpose of explanation, a description of one embodiment of a rendering pipeline 510 is provided below by reference to FIGS. 7 and 10. More detailed explanations of the operation of some of the modules of rendering pipelines 700 and 1000, and of some of the additional features that can be incorporated in these rendering pipelines (such as parameter interpolation shadow plane tests, and alpha blending), can be found in the United States Patent Applications entitled: "Computer Graphics System Having High Performance Multiple Layer Z-Buffer," Ser. No. 08/237,639, filed May 4, 1994 and assigned to Apple Computer, Inc.; "Computer Graphics System Having High Performance Multiple Layer Z-Buffer," Ser. No. 08/060,299, filed May 10, 1993 and assigned to Apple Computer, Inc.; "Method And Apparatus For Distributed Interpolation Of Pixel Shading Parameter Values," Ser. No. 07/812,563, filed Dec. 20, 1991 and assigned to Apple Computer, Inc.; "Method And Apparatus For Simultaneously Rendering Multiple Scanlines," Ser. No. 07/811,570, filed Dec. 20, 1991 and assigned to Apple Computer, Inc.; "A Scanline Rendering Device For Generating Pixel Values For Displaying Three-Dimensional Graphical Images," Ser. No. 08/359,953, filed Dec. 19, 1994 and assigned to Apple Computer, Inc.; "Method And Apparatus For Approximating A Signed Value Between Two Endpoint Values In A Three-Dimensional Image Rendering Device," Ser. No. 08/051,473 filed Apr. 22, 1993 and assigned to Apple Computer, Inc.; and, in U.S. Pat. No. 5,345,541, entitled "Method And Apparatus For Approximating A Value Between Two Endpoint Values In A Three-Dimensional Image Rendering Device," filed Dec. 20, 1991 and assigned to Apple Computer, Inc. Furthermore, it is to be understood that alternative rendering pipelines can be employed in conjunction with the teachings of the present invention.

Figure 7:
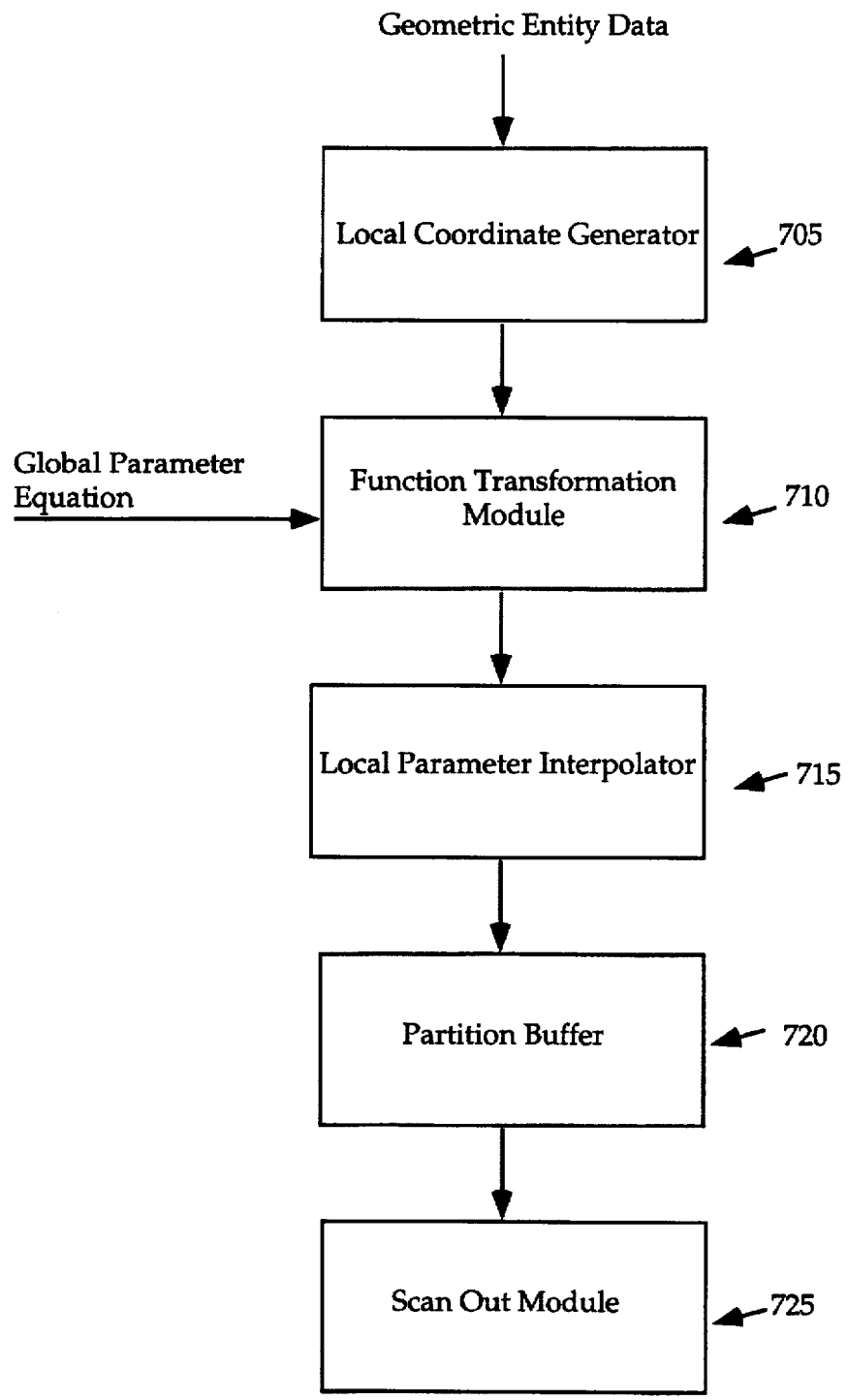
FIG. 7 presents one embodiment of the rendering pipeline of FIG. 5.

As shown in FIG. 7, the first module of rendering pipeline 700 is a local coordinate generator 705. This local coordinate generator (1) obtains the global boundary defining data (e.g., the vertex coordinates defined relative to the display device coordinate system) of the geometric entity that intersects a region that it renders, and (2) generates the local positional data (the x and y coordinates defined relative to the local coordinate system of the region that the pipeline renders) of the vertices of the geometric entity. For example, if the parameter interpolation function is $p(x,y)=ax+by+c$, then the local coordinate generator generates the local coordinates for the vertices of the geometric entity by using the following equations:

$x_{Left}$=global coordinate of the left edge of partition;

$x'$=local coordinates for the horizontal component=$x-x_{Left}$;

$y_{Top}$=global coordinate of the top edge of partition $y'$=local coordinates for the vertical component=$y-y_{Top}$.

From these local coordinates for the vertices of the geometric entities, the local coordinate generator also generates the remaining pixels in the rendered region that are covered by the geometric entity, by using one of the numerous prior art methods for deriving coordinates for the covered pixels of a partition from the vertex data (such as the direct evaluation of the line equations for the triangle edges for each scanline in the partition). Another example of general polygon scan-conversion methods that use vertex data to determine which pixels are covered by a geometric entity is described in "Computer Graphics, Principles and Practice, 2nd Edition," Foley, van Dam, Feiner, and Hughes, Addison Wesley, pp. 92–95.

Furthermore, as shown in FIG. 7, each rendering pipeline has a function transformation module 710 for transforming the global parameter equation (that is defined with respect to the display device coordinate system), that graphics accelerator 500 supplies to it into a new local parameter equation that is defined with respect to the local coordinate system for the local region that the pipeline renders. For example, if the global parameter interpolation function is $p(x,y)=ax+by+c$, the function transformation module transforms this parameter equation (that is defined with respect to the display device coordinate system) into parameter equation $p'(x',y')=ax'+by'+c'$ (that is defined with respect to the rendered region's local coordinate system) by using the following equations to change the origin's parameter value from c to c':

$$p'(x_{Left}-x_{Left}, y_{Top}-y_{Top})=p(x_{Left}, y_{Top});$$

$$a(0)+b(0)+c'=p(x_{Left}, y_{Top})$$

$$c'=a(x_{Left})+b(y_{Top})+c.$$

Figure 1:
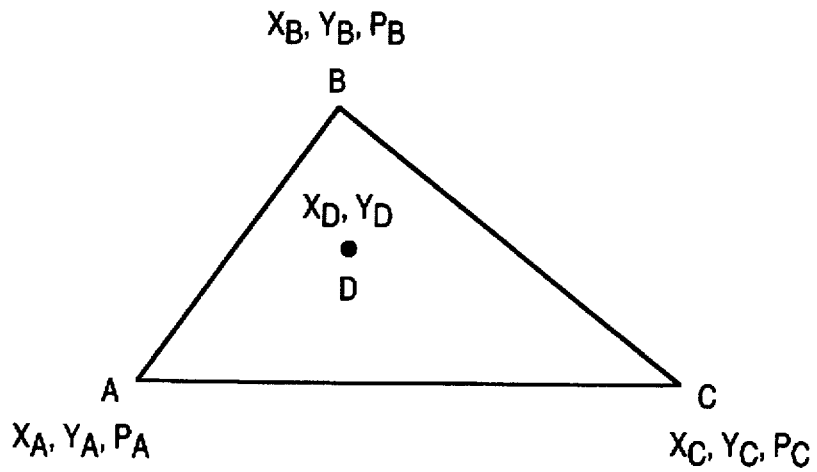
FIG. 1 presents a diagram of a screen space triangle.
Figure 2:
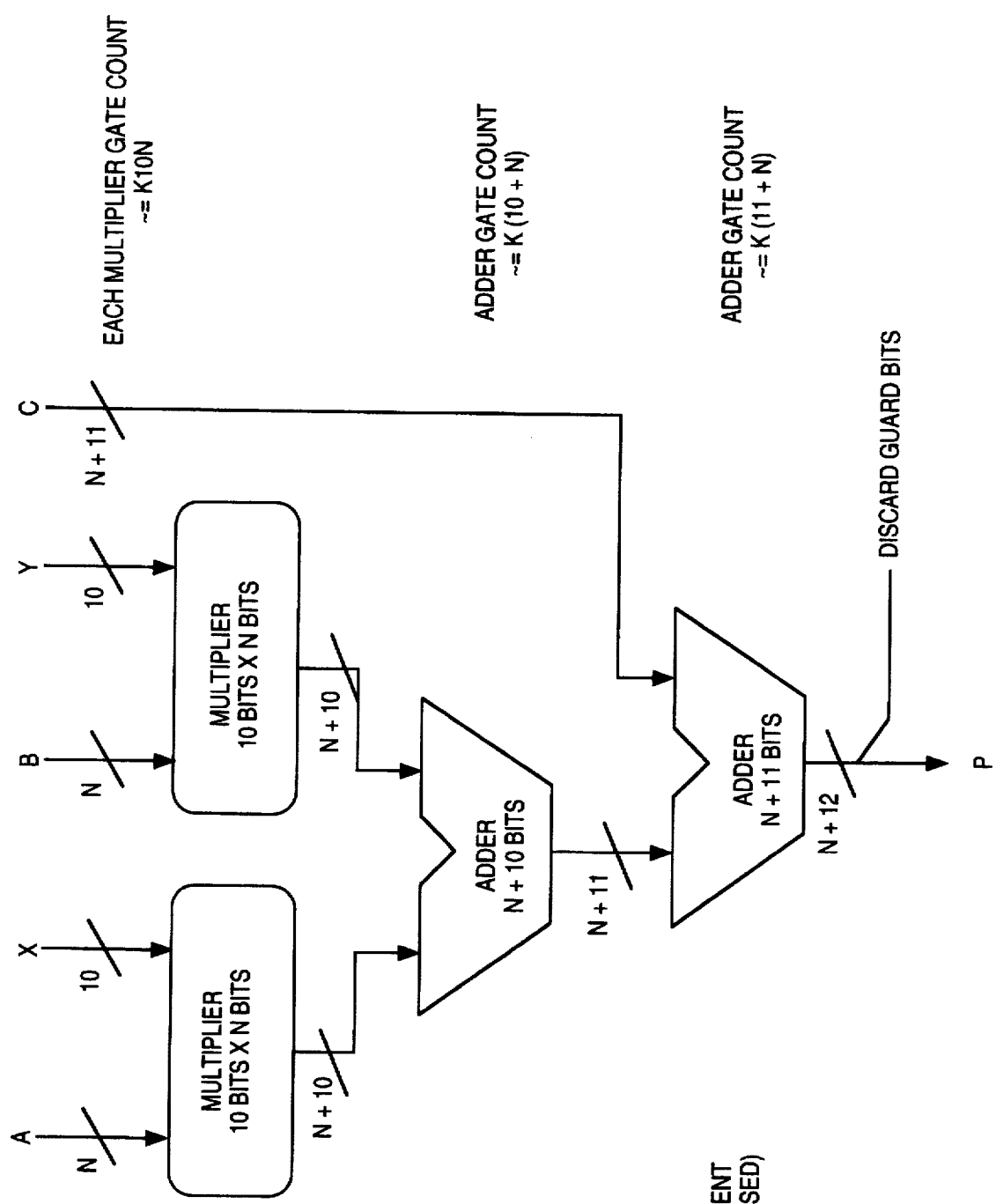
FIG. 2 presents one prior art hardware implementation of a direct interpolator.
Figure 3:
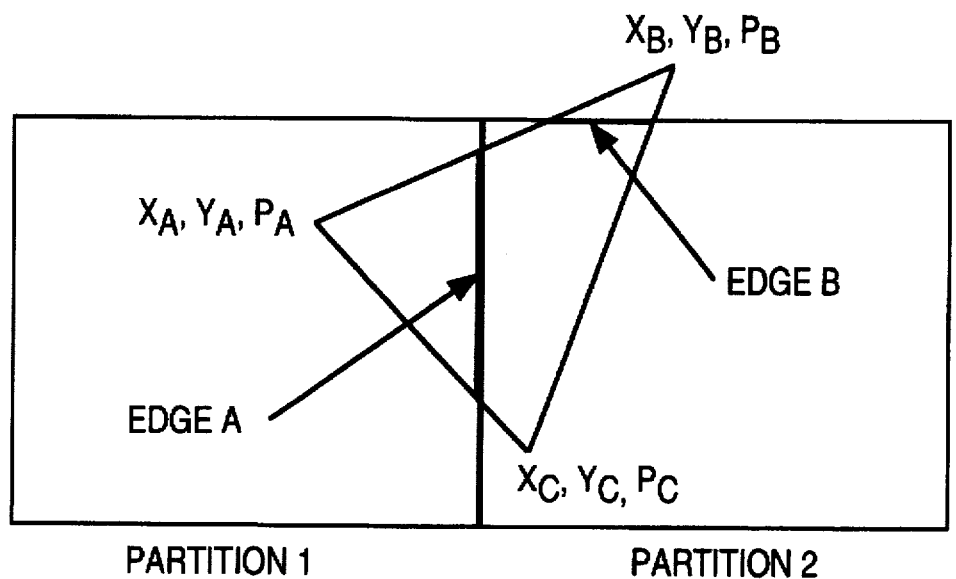
FIG. 3 presents a screen space triangle which crosses screen partitioning boundaries.

In addition, the rendering pipeline includes local parameter interpolation module 715 for directly evaluating the parameter values for every pixel in the rendered region that are covered by the geometric entity, by using the local parameter interpolation function and the generated local coordinates for these pixels. For example, assume that the global parameter interpolation function is $p(x,y)=ax+by+c$, and assume that the screen is partitioned into 16×16 pixel regions (therefore, a 1024×1024 screen would produce a total of 4096 partitions). Now, for each partition, the equation $p(x,y)=ax+by+c$ is transformed into the local parameter interpolation equation $p'(x',y')=ax'+by'+c'$ for directly interpolating parameter p by using the covered pixels' generated local coordinates (x', y'). As the partition size is 16×16, x' and y' are represented by 4 bit values. Consequently, local parameter interpolator 800 of FIG. 8 can be used to implement interpolation module 715. As evident from FIG. 8, interpolator 800 requires much fewer gates, and therefore is much smaller and faster than prior art direct interpolators, such as the example shown in FIG. 2.

Figure 8:
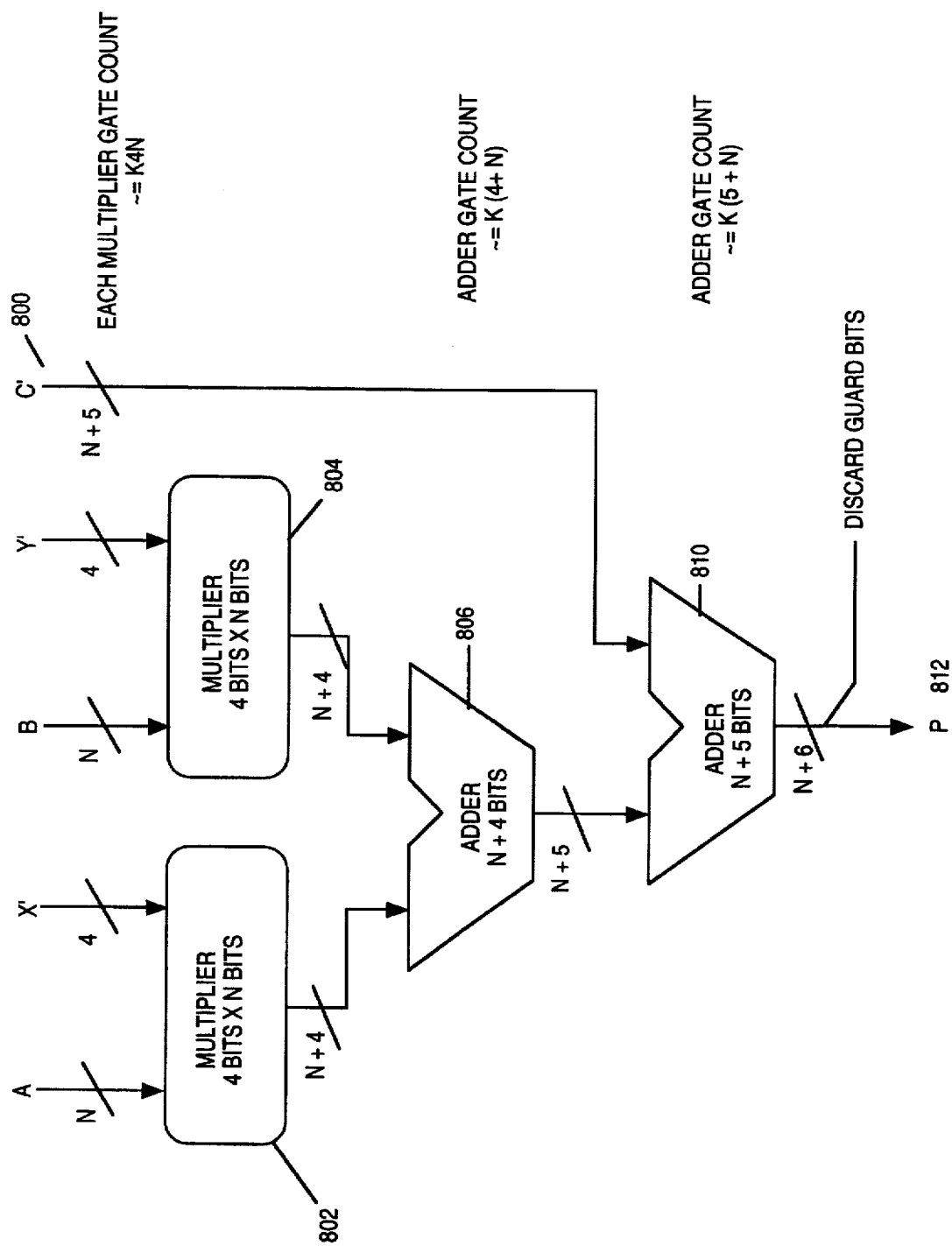
FIG. 8 presents one embodiment of the direct local parameter interpolator of FIG. 6.

FIG. 8 illustrates one embodiment of the direct local parameter interpolator. A first multiplier 802 receives inputs a and x'. The first multiplier 802 calculates the product of a and x' and sends this product to an adder 806. The present invention also includes a second multiplier 804 that receives as inputs, b and y'. The second multiplier 804 calculates the product of b and y' and sends the product of b and y' to the adder 806. The Adder 806 receives the product of a and x' from the first multiplier 802 and the product of b and y' from the second multiplier 804 and calculates the sum of those two products. A second adder 810 calculates the sum of the output of the first adder 806 and c'. The output of the second adder 810 is the value p 812, which is equal to $ax'+by'+c'$.

It should be noted that the computation of c' requires full precision multiplies (e.g., in this example, 10 bit×N bit).

This may appear to negate the savings of interpolator 800. However, this isn't the case. For example, assume that each set of parameter interpolation function constants a, b, c is used for 25 pixels within a partition (a conservative estimate, as triangles are typically assumed to be represented by 50 pixels). In that case, $p'(x',y')$ will be evaluated 25 times more often than the computation of c'. This difference in evaluation throughput means that the evaluation circuit for c' can be designed using much more compact and slower methods (such as using shift-and-add multipliers) than those used in FIG. 8. Further, because there is typically a large number of different interpolated parameters (e.g., r, g, b, and z for classic Gouraud shading), this means that a single instance of the evaluation circuit for c' can be shared by a large number of instances of the circuit shown in FIG. 8, in order to further amortize the gates used for c' evaluation. In fact, in a system with multiple rendering pipelines, the c' evaluation circuit may even be shared by several complete pipelines.

In many cases, a further optimization to the interpolator of FIG. 8 can be performed. Typically, rasterization of a triangle is performed in y-x order (i.e., the y value is set to a new scan line, and then the x value is varied to sweep out a span of pixels across that scan line). When this evaluation pattern is used with local parameter interpolation equation $p'(x',y')=ax'+by'+c'$, there will typically be several evaluations in a row in which the y' value does not change. For example, if a typical triangle span is 8 pixels wide, then there will be eight evaluations of $p'(x',y')$ in which y' does not change. Because y' changes much less frequently than x', interpolator 900 of FIG. 9 has a single multiplier, which is used either to evaluate ax' or by'. Furthermore, by computing and storing a temporary value $c''=by'+c'$, the circuit size is reduced almost 50% with only a slight decrease in performance (e.g. a 1/8=12.5% slowdown for a typical span width of 8 pixels).

Figure 9:
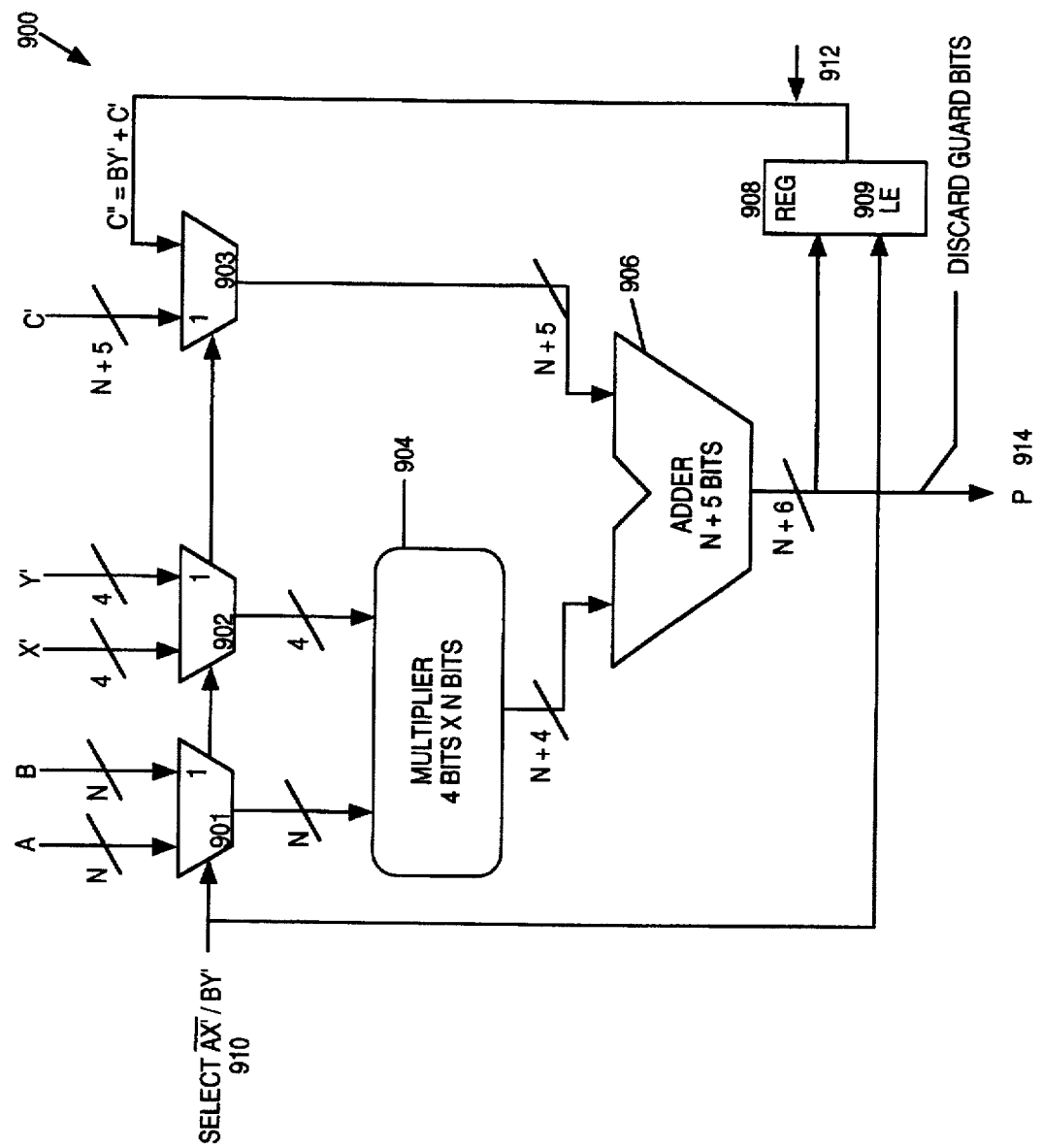
FIG. 9 presents another embodiment of the direct local parameter interpolator of FIG. 6.

FIG. 9 illustrates another embodiment of the direct local parameter interpolator of the present invention. A first multiplexor 901 receives inputs, a and b, and selects either a or b to output to a multiplier 904. A multiplexor 902 receives the inputs, x' and y', and selects either x' or y' to output to the multiplier 904. A third multiplexor 903 selects between two of its inputs, c' and c". The output of the third multiplexor 903 is also sent to an adder 906. This embodiment also includes a register 908 that stores a temporary value, c", and outputs this value 912 to one of the inputs of the third multiplexor 903.

The operation of the circuit illustrated in FIG. 9 will now be described. A select signal, ax'/by' 910 is coupled to the first 901, second 902 and third 903 multiplexors to control which of the inputs of each multiplexor is selected. When select signal 910 is high, indicating that by' is selected, the first multiplexor 901 will select b, the second multiplexor 902 will select y' and the third multiplexor 903 will select c'. The output of multiplier 904 is the product of b and y'. The sum calculated by adder 906 will be equal to by'+c', which is stored as temporary value c". The output of adder 906 is stored to register 908. Select signal 910 also serves to enable register 908 by asserting a load enable pin 909 of register 908. The value stored in register 908 is c" 912. The value, c", is sent to the third multiplexor 903 for a subsequent operation.

When select signal 910 is low, indicating that ax' is selected, the first multiplexor 901 selects a, the second multiplexor 902 selects x' and the third multiplexor 903 selects c". The output of the multiplier 904 is equal to the product of a and x'. The output of adder 906 is equal to the sum of ax' and c". In other words, the output of adder 906 is the parameter value p 914, which is equal to ax'+by'+c'. In this manner, for one value of by', a plurality of ax' values may be calculated. In other words, where y' does not change, a number of parameter values for a varying x'may be calculated.

It will be evident to one skilled in the art that the first, second, and third multiplexors may be implemented as one multiplexor since the select control line 910 is common to the first 901, second 902 and third 903 multiplexors. If the three multiplexors are implemented as one multiplexor, upon a high select signal, by' will be sent to the multiplier 904, and c' will be sent to the adder 906. If a low select signal 910 is sent to the multiplexor, multiplier 904 receives a and x', and c" is selected and sent to adder 906.

As further shown in FIG. 7, after the local parameter interpolator directly calculates the parameter values for all of the pixels of the geometric entity that fall into the rendered region, partition buffer 720 is then used to collect the final values of the pixels for the partition being processed. Once all the objects in the partition have been processed, the contents of the partition buffer is transferred to the system frame buffer via scan out module 725. In other words, scan out module is used to transfer to the system frame buffer the contents of the partition buffer. It should be noted that for an alternative embodiment of rendering pipeline 700, the output of local parameter interpolator 715 is not supplied to partition buffer 720 but rather is supplied to a pixel buffer. The parameter values can then later be obtained from the pixel buffer in order to perform additional calculations with them.

Figure 10:
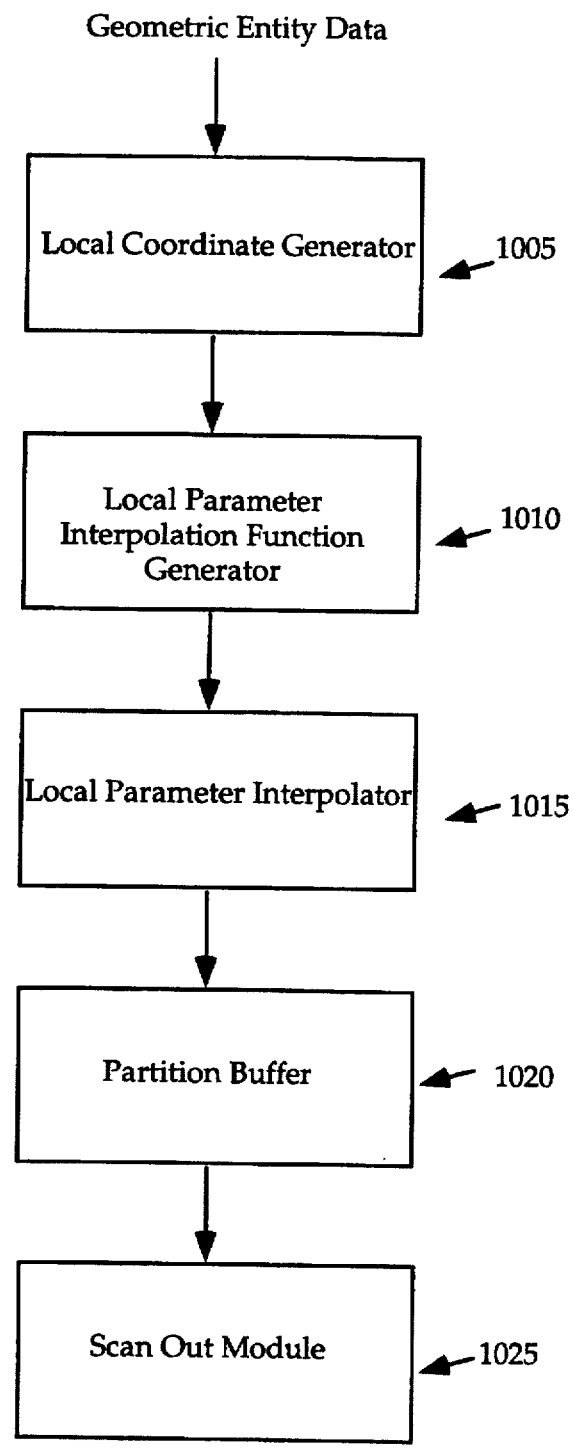
FIG. 10 presents another embodiment of the rendering pipeline of FIG. 5.

FIG. 10 presents another embodiment of rendering pipeline 510 of FIG. 5. Rendering pipeline 1000 is identical in every respect with rendering pipeline 700, except that instead of having a function transformation module 710 it has local interpolation function computation module 1010. As opposed to function transformation 710 which receives the global parameter function to generate a local parameter function, local interpolation function computation module 1010 receives the vertex boundary and parameter defining data of the geometric entity and generates from this data a local parameter interpolation function, in much the same way as the prior art generates a global parameter interpolation function from the global vertex data of the geometric entity. For example, if module 1010 receives the global o coordinates for the geometric entity's vertices and the parameter values at those vertices, and if the parameter interpolation function is in the form of p'(x',y')=ax'+by'+c', module 1010 determines the value of constants a, b, and c' from the vertex coordinate and parameter data.

Module 1010 typically includes a division block that calculates the slope of the edges, and a state machine that performs a forward differencing algorithm which iterates along the edges to define a span. The specific circuit implementation of this block is known in the art. An example of a general interpolation function computation module is discussed in "Computer Graphics Principles and Practice" 2nd Edition, "Foley, Van Dam, Feiner, and Hughes, Addison Wesley, pp. 92–95.

Figure 11:
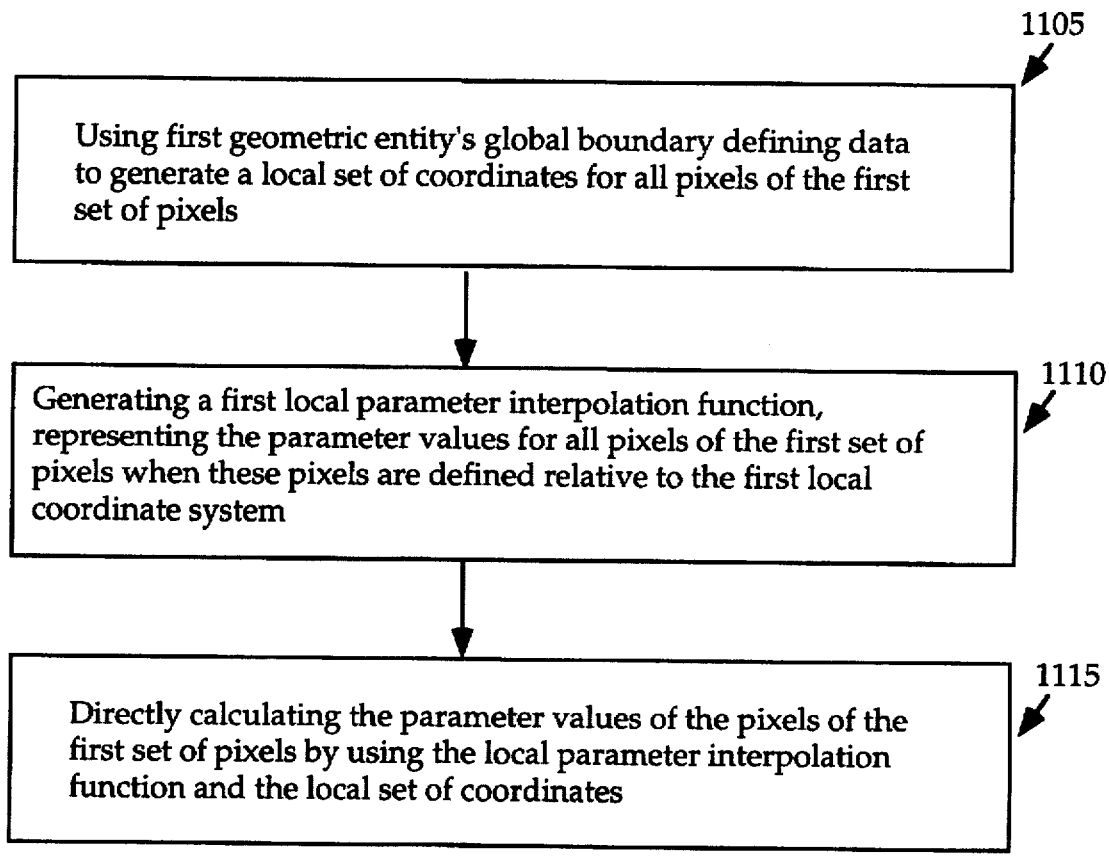
FIG. 11 presents one embodiment of the present invention's method for directly evaluating a parameter interpolation function used in rendering images in a computer graphic system that uses screen partitioning.

FIG. 11 presents one embodiment of the present invention's method for directly calculating parameter values for a first set of pixels of a display device, which the computer graphics system partitions into a number of local regions. The computer graphic system initially determines that the geometric entity covers the first set of pixels in a first local region of the display device (i.e., a first set of pixels fall between the boundaries of the geometric entity in the first local region). This embodiment of the present invention's method then, at step 1105, uses geometric entity's global boundary defining data (e.g., the geometric entity's vertex coordinates defined relative to a display device coordinate system) to generate a local set of coordinates (i.e., coordinates defined relative to the coordinate system of the first local region) for all pixels of the first set of pixels.

At step 1110, a first local parameter interpolation function, which represents the parameter values for all pixels of the first portion when these pixels are defined relative to the first local coordinate system, is then generated. One embodiment of the method of FIG. 11 generates the first local parameter interpolation function from a global parameter interpolation function, which represents the parameter values for all pixels of the display device that are covered by the geometric entity, when these pixels are defined relative to the display device coordinate system. Another embodiment of the method of FIG. 11, however, transforms the geometric entity's global boundary defining data to a local boundary defining data (e.g., transforms the global vertex coordinates into local vertex coordinates) and then uses the generated local boundary and parameter defining data to generate the first local parameter interpolation function. Finally, at step 1115, the local parameter interpolation function and the local set of coordinates are used to directly calculate the parameter values of the pixels of the first set of pixels.

Figure 12:
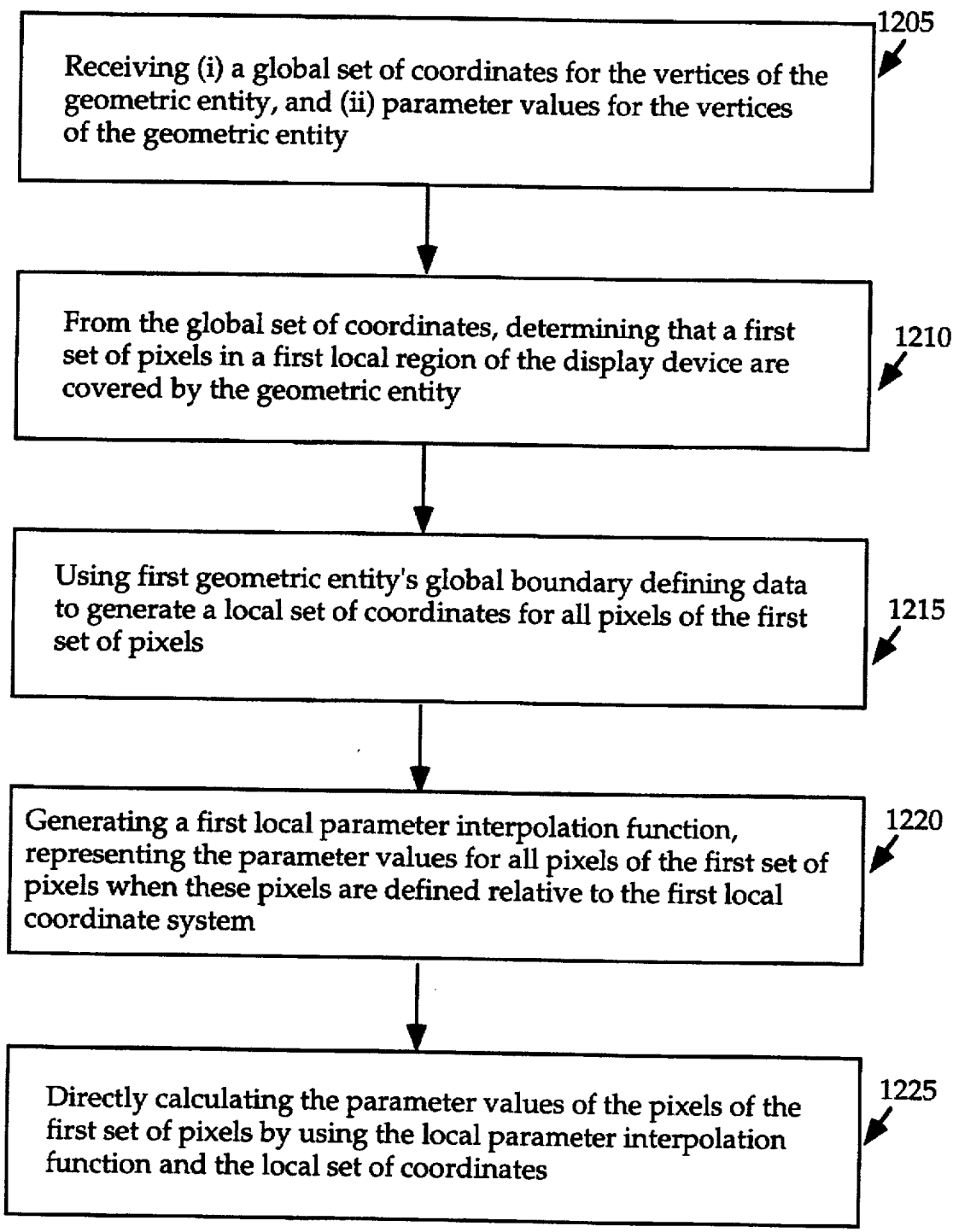
FIG. 12 presents another embodiment of the present invention's method for directly evaluating a parameter interpolation function used in rendering images in a computer graphic system that uses screen partitioning.

FIG. 12 presents another embodiment of the present invention's method for directly calculating parameter values for a first set of pixels of a display device, which the computer graphics system partitions into a number of local regions. As shown in this figure, at step 1205, a global set of coordinates (i.e., coordinates defined relative to a display device coordinate system) for the vertices of the geometric entity is received. In addition, at this step, the parameter values for the vertices of the geometric entity are also received. At step 1210, from the global set of vertex coordinates, a determination is made that the first set of pixels of a first local region of the display device are covered by the geometric entity.

At step 1215, a first local set of coordinates (i.e., coordinates defined relative to a first local coordinate system) for all pixels of the first set of pixels is generated by using the global set of vertex coordinates. At step 1220, a first local parameter interpolation function, which represents the parameter values for all pixels of the first set of pixels when these pixels are defined relative to the first local coordinate system, is generate. One embodiment of the method of FIG. 12 generates the first local parameter interpolation function from a global parameter interpolation function that represent the parameter values for all the pixels that the geometric entity covers on the display device, when these pixels are defined relative to the display device coordinate system. Another embodiment of the method of FIG. 12 initially generates local vertex coordinate and parameter values from global vertex coordinate and parameter values, and then uses these generated local vertex coordinate and parameter values to generate the first local parameter interpolation function. Finally, at step 1225, the first local parameter interpolation function and the first local set of coordinates are used to directly calculate the parameter values for the pixels of the first set of pixels.

By utilizing the above-described teachings of the present invention, computer graphic systems can now generate interpolated parameter values for pixels in a fast and inexpensive manner. More specifically, for a computer graphics system which uses screen partitioning, the present invention greatly reduces the amount of hardware necessary for implementing direct evaluation of interpolated parameter values. Due to this reduction in the amount of hardware, the speed and the cost of the evaluation circuit is also improved. These advantages stem from creating a new representation of the function p(x,y) in each screen partition's local coordinate space, and then changing the structure of the evaluation circuit to exploit the new coordinate system.

One of ordinary skill in the art would recognize that the above-described invention may be embodied in other specific forms without departing from the spirit or the essential characteristics of the disclosure. For example, in an alternative embodiment of rendering device 460 that is shown in FIG. 5, screen partitioning modules in the rendering pipelines determine whether the geometric entities intersect the regions that they render, rather than the graphics accelerator making this determination. Thus, while certain exemplary embodiments have been described and shown in the accompanying drawings, the invention is not to be limited by the foregoing illustrative details but rather is to be defined by the appended claims.

What is claimed is:

1. A computer graphics system adapted to be coupled to a display device for displaying pixel data representing geometric entities comprising:
(a) a screen partitioning circuit for partitioning said display device into a plurality of local regions, determining that a first geometric entity covers a first set of pixels in a first local region of the display device, and generating a first geometric entity's boundary defining data that is defined relative to a display device coordinate system;
(b) a first local coordinate generator coupled to said screen partitioning circuit for receiving said first geometric entity's boundary defining data and generating in response thereto a first local set of coordinates, defined relative to a first local coordinate system of said first local region, for all pixels of said first set of pixels;
(c) a first local parameter interpolation function generator generating a first local parameter interpolation function, representing parameter values for all pixels of said first set of pixels when these pixels are defined relative to said first local coordinate system; and
(d) a first local parameter interpolator coupled to said first local coordinate generator and said first local parameter interpolation function generator, said first local parameter interpolator directly calculating the parameter values for each pixel of said first set of pixels by using said first local parameter interpolation function and said first local set of coordinates.

2. The computer graphics system of claim 1, wherein said directly calculated parameter values are stored in said buffer.

3. The computer graphics system of claim 1, wherein said parameter values are pixel shading values, said computer graphics system using said directly calculated parameter values to shade said first set of pixels.

4. The computer graphics system of claim 1, wherein said first local parameter interpolation function generator generates said first local parameter interpolation function from a global parameter interpolation function representing parameter values for all pixels of said display device, that said first geometric entity covers, when these pixels are defined relative to said display device coordinate system.

5. The computer graphics system of claim 4, wherein said first local region has a first side defined by horizontal coordinate $x_{SIDE1}$ and a second side defined by vertical coordinate $y_{SIDE2}$, said global parameter interpolation function is p(x,y)=ax+by+c and said first local parameter interpolation function is p'(x',y')=ax'+by'+c', where $c'=a(x_{SIDE1})+b(y_{SIDE2})+c$.

6. The computer graphics system of claim 1, wherein said first local parameter interpolation function generator includes:
a) circuitry using global boundary and parameter defining data of said first geometric entity to generate local boundary and parameter defining data of said first geometric entity; and
b) circuitry generating the local parameter interpolation function from the local boundary and parameter defining data of the first geometric primitive.

7. The computer graphics system of claim 6, wherein said first local parameter interpolation function is p'(x',y')=ax'+by'+c', wherein a and b are computed from said global boundary and parameter defining data, while c' is computed from said local boundary and parameter defining data.

8. The computer graphics system of claim 5 or claim 7, wherein said first local parameter interpolator includes:
a) a first multiplier receiving a constant, a, and a horizontal coordinate, x', of a first pixel of said first set of pixels from said first local parameter interpolation function generator, and a second multiplier receiving a constant, b, and a vertical coordinate, y', of the first pixel of said first set of pixels from said first local parameter interpolation function generator, said first multiplier multiplying a and x' and the second multiplier multiplying b and y';
b) a first adder coupled to the first and second multipliers for receiving the results of the multiplications performed by said first and second multiplier and adding the results; and
c) a second adder coupled to the first adder for adding the result of the addition performed by said first adder and receiving c' to produce the parameter value for said first pixel.

9. The computer graphics system of claim 5 or 7, wherein said first local parameter interpolator includes:
a) a multiplexor for receiving a, b, a horizontal coordinate of a first pixel of said first set of pixels and a vertical coordinate of the first pixel of said first set of pixels, c', and c", said multiplexor receiving a select control signal;
b) a multiplier coupled to the multiplexor for receiving at least one of a first set of values, a and x', and a second set of values, b and y', and calculating a product, wherein whether the first set or second set is received by the multiplier is determined by the select control signal;
c) an adder coupled to the multiplier for calculating the sum of the product of the multiplier and at least one of c' and c"; and
d) a register coupled to the adder and the multiplexor, said register receiving the select control signal;
wherein the register stores the value of c" when the select control signal is at a predetermined level; wherein the register has an output, said output being coupled to an input of the multiplexor.

10. The computer graphics system of claim 1, wherein said computer graphics system further determines that said first geometric entity covers a second set of pixels in a second local region of said display device, said apparatus further comprising:
(a) a second local coordinate generator receiving said first geometric entity's boundary defining data, defined relative to a display device coordinate system, to generate a second local set of coordinates, defined relative to a second local coordinate system of said second local region, for all pixels of said second set of pixels;

(b) a second local parameter interpolation function generator generating a second local parameter interpolation function representing parameter values for all pixels of said second set of pixels when these pixels are defined relative to said second local coordinate system; and (c) a second local parameter interpolator coupled to said second local coordinate generator and said second local parameter interpolation function generator, said second local parameter interpolator directly calculating the parameter values for each pixel of said second set of pixels by using said second local parameter interpolation function and said second local set of coordinates, wherein the second local coordinate generator, parameter function generator and parameter interpolator operate in parallel and concurrently with the first local coordinate generator, parameter function generator and parameter interpolator.

11. For a computer graphics system having a buffer and a display device, said buffer for storing pixel data representing geometric entities, said computer graphics system partitioning said display device into a plurality of local regions and determining that a first geometric entity covers a first set of pixels in a first local region of said display device, a method of directly calculating parameter value for each pixel of said first set of pixels, said method comprising the steps of:

(a) using first geometric entity's boundary defining data, defined relative to a display device coordinate system, to generate a local set of coordinates, defined relative to a first local coordinate system of said first local region, for all pixels of said first set of pixels;

(b) generating a first local parameter interpolation function representing parameter values for all pixels of said first set of pixels when these pixels are defined relative to said first local coordinate system; and (c) directly calculating the parameter values for each pixel of said first set of pixels by using said local parameter interpolation function and said local set of coordinates.

12. The method of claim 11 further comprising the step of storing said calculated parameter values for said first set of pixels in said buffer.

13. The method of claim 12, wherein said parameter values are pixel shading values, said method further comprising the step of shading said first set of pixels by using said calculated parameter values for said first set of pixels.

14. The method of claim 11, wherein said local parameter interpolation function is generated from a global parameter interpolation function representing parameter values for all pixels of said display device that said first geometric entity covers, when these pixels are defined relative to said display device coordinate system.

15. The method of claim 14, wherein said first local region has a first side defined by horizontal coordinate $x_{SIDE1}$ and a second side defined by vertical coordinate $y_{SIDE2}$, said global parameter interpolation function is $p(x,y)=ax+by+c$ and said local parameter interpolation function is $p'(x',y')=ax'+by'+c'$, where $c'=a(x_{SIDE1})+b(y_{SIDE2})+c$.

16. The method of claim 11, wherein the steps for generating said local parameter interpolation function include:

a) using global boundary and parameter defining data of said first geometric entity to generate local boundary and parameter defining data of said first geometric entity; and b) generating the local parameter interpolation function from the local boundary and parameter defining data of the first geometric primitive.

17. The method of claim 16, wherein said local parameter interpolation function is $p'(x',y')=ax'+by'+c'$, wherein a and b are computed from said global boundary and parameter defining data, while c' is computed from said local boundary and parameter defining data.

* * * * *

UNITED STATES PATENT AND TRADEMARK OFFICE
CERTIFICATE OF CORRECTION

PATENT NO.   :   5,701,405
DATED        :   December 23, 1997
INVENTOR(S)  :   Kelley et al.

It is certified that error appears in the above-identified patent and that said Letters Patent is hereby corrected as shown below:

In column 1 at line 30 delete "pixe's" and insert --pixel's--

Signed and Sealed this

Thirty-first Day of March, 1998

Attest:

BRUCE LEHMAN

*Attesting Officer*            *Commissioner of Patents and Trademarks*